(12) United States Patent
Martinez

(10) Patent No.: US 10,668,908 B2
(45) Date of Patent: Jun. 2, 2020

(54) BRAKE FLUID RESERVOIR

(71) Applicant: Robert Bosch GmbH, Stuttgart (DE)

(72) Inventor: Alejandro Martinez, Plymouth, MI (US)

(73) Assignee: Robert Bosch GmbH, Stuttgart (DE)

( * ) Notice: Subject to any disclaimer, the term of this patent is extended or adjusted under 35 U.S.C. 154(b) by 145 days.

(21) Appl. No.: 15/812,180

(22) Filed: Nov. 14, 2017

(65) Prior Publication Data

US 2019/0143951 A1 May 16, 2019

(51) Int. Cl.
*B60T 11/26* (2006.01)
*B60T 17/06* (2006.01)

(52) U.S. Cl.
CPC .............. *B60T 11/26* (2013.01); *B60T 17/06* (2013.01)

(58) Field of Classification Search
CPC .......... B60T 17/06; B60T 11/22; B60T 11/26; F15B 20/005
USPC ........................................................ 60/585
See application file for complete search history.

(56) References Cited

U.S. PATENT DOCUMENTS

| | | | |
|---|---|---|---|
| 2003/0062371 A1 | 4/2003 | Hirao | |
| 2010/0287930 A1 | 11/2010 | Lenczner et al. | |
| 2016/0031425 A1* | 2/2016 | Misunou | B60T 7/042 60/585 |

FOREIGN PATENT DOCUMENTS

| | | |
|---|---|---|
| FR | 3004705 | 10/2014 |
| JP | S58-85966 | 6/1980 |
| JP | S58-8666 | 1/1983 |
| WO | 2017153470 | 9/2017 |

OTHER PUBLICATIONS

PCT International Search Report for PCTEP2018/080260.

* cited by examiner

*Primary Examiner* — Michael Leslie
*Assistant Examiner* — Daniel S Collins
(74) *Attorney, Agent, or Firm* — David Kovacek; Maginot, Moore & Beck LLP

(57) ABSTRACT

A brake fluid reservoir for a vehicle comprising: a shell defining a main chamber for containing a quantity of brake fluid for one or more vehicle brake circuits having an outer surface; a fill opening defined by the shell in an upper portion of the outer shell, the fill opening in fluid communication with the main chamber and closable by a cap to close the main chamber from the surrounding environment; outlet ports defined by the shell in a lower portion of the outer shell, the outlet ports in fluid communication with the main chamber; and a channel located along at least a section of the outer surface between the fill opening and the outlet ports, wherein the channel is configured to collect fluid when fluid exits the opening along the outer surface.

20 Claims, 8 Drawing Sheets

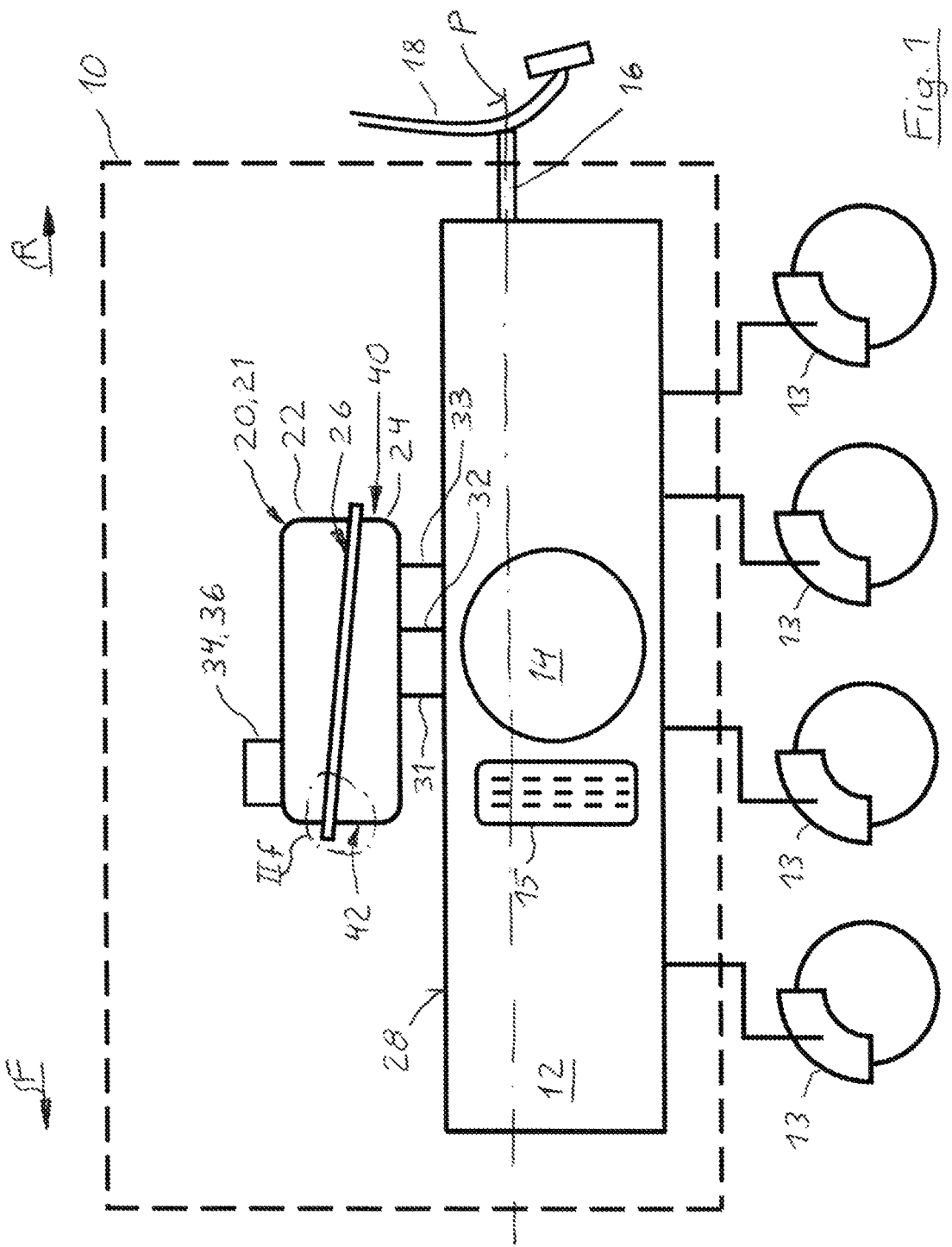

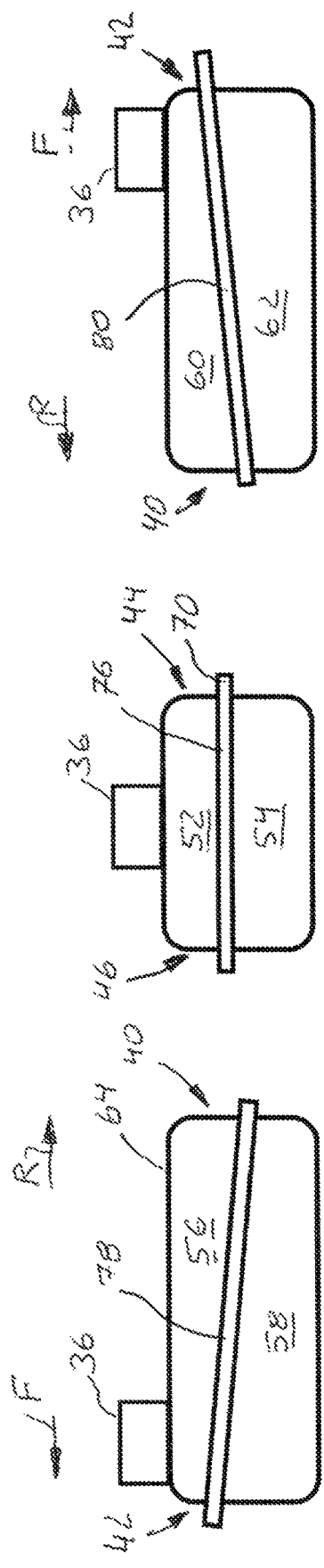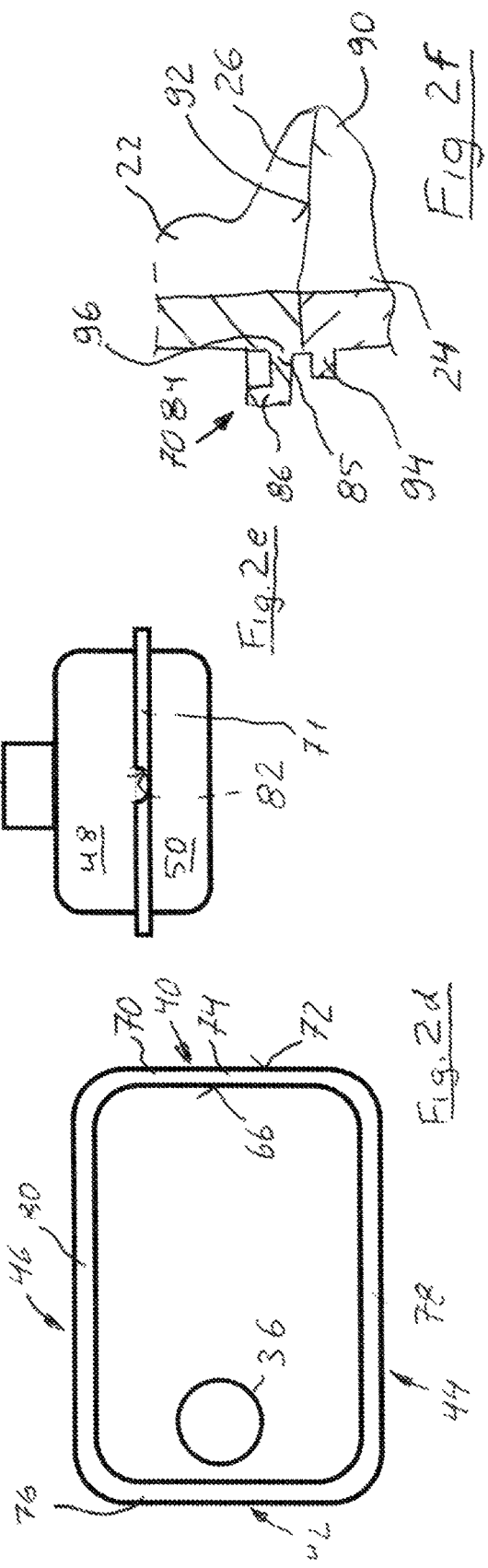

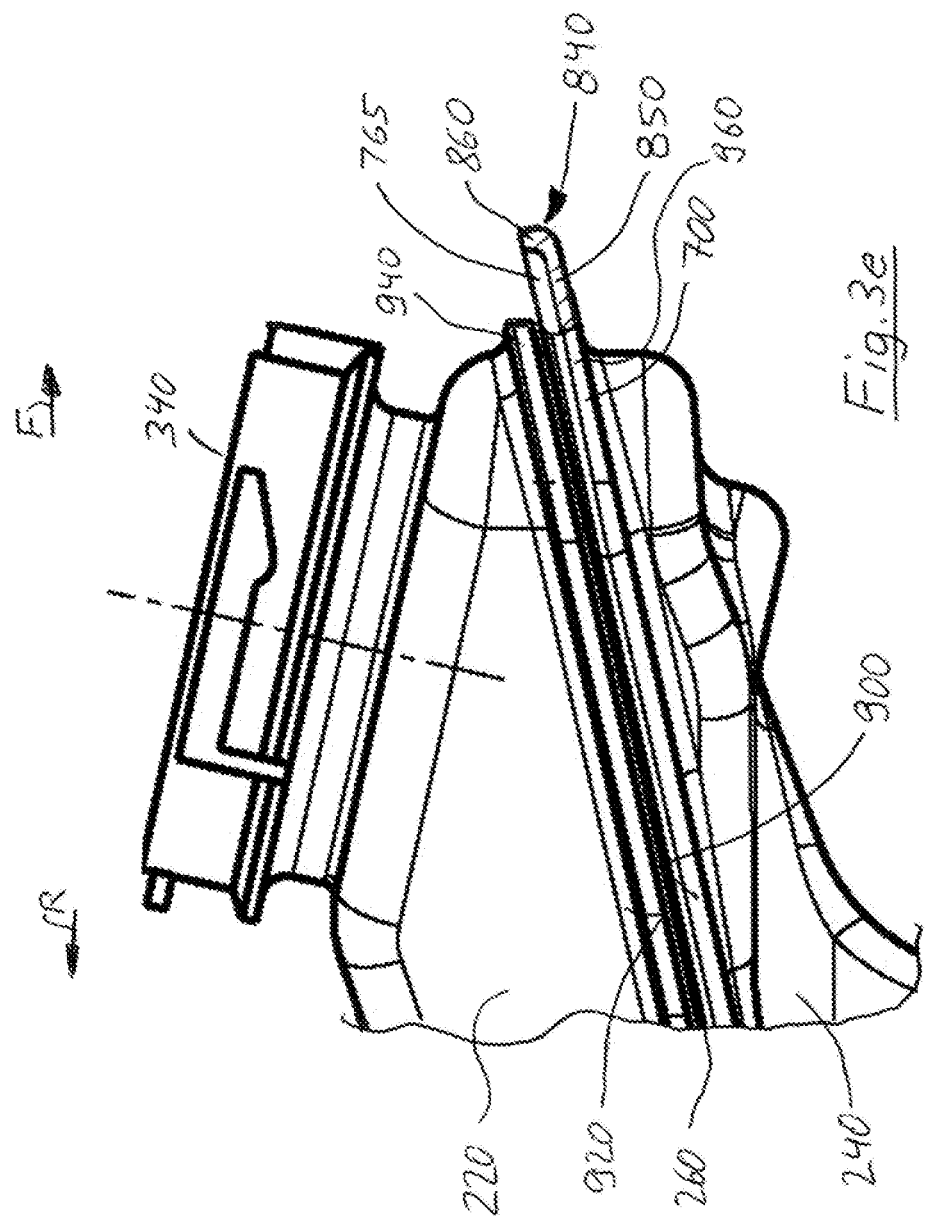

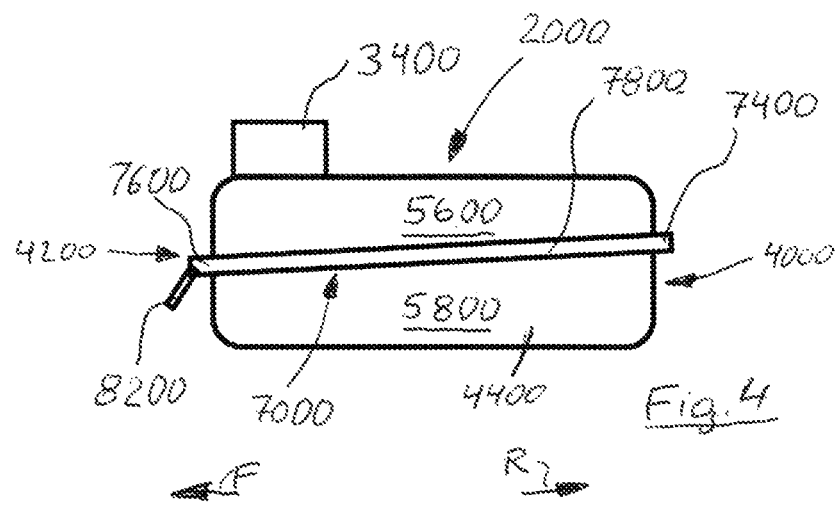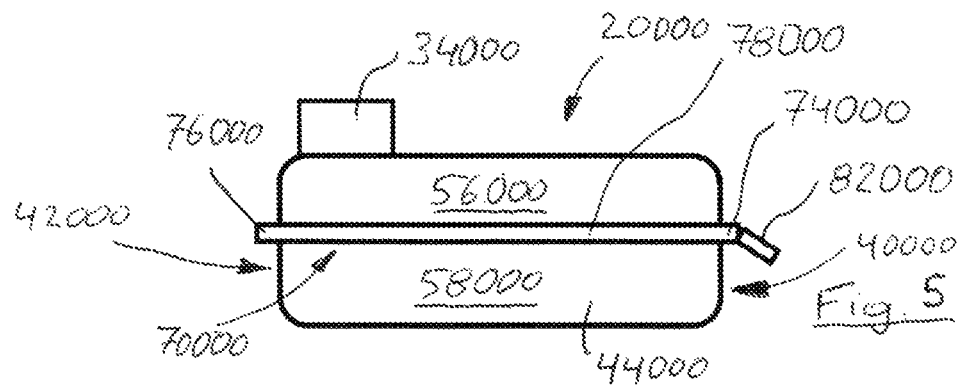

US 10,668,908 B2

BRAKE FLUID RESERVOIR

BACKGROUND

The present invention relates to vehicle braking systems, and more particularly to a fluid reservoir construction. Brake fluid may sometimes leak out of reservoirs and could damage components such as electrical connections. Brake fluid outside of the reservoir in the engine compartment is also a risk because it is flammable.

SUMMARY

This invention aims to collect leaked brake fluid so that it remains on the reservoir and does not damage other components or it may be used to direct the flow of spilled brake fluid so that it will drip in a desirable location where it does not cause damage to susceptible components.

In one aspect, the invention provides a brake fluid reservoir for a vehicle comprising: a shell defining a main chamber for containing a quantity of brake fluid for one or more vehicle brake circuits having an outer surface; a fill opening defined by the shell in an upper portion of the outer shell, the fill opening in fluid communication with the main chamber and closable by a cap to close the main chamber from the surrounding environment; outlet ports defined by the shell in a lower portion of the outer shell, the outlet ports in fluid communication with the main chamber; and a channel located along at least a section of the outer surface between the fill opening and the outlet ports, wherein the channel is configured to collect fluid when fluid exits the opening along the outer surface. At least a portion of the channel may be arranged at an angle to increase flow of fluid in the channel. The channel may be arranged along a first perimeter of the brake fluid reservoir. A drain may be arranged at a lowest portion of the channel. The channel may have a cross section with a first portion extending away from the outer surface of the outer wall and a second portion extending upward from the first portion. A section of the channel which is closest to the fill opening may be wider than portions of the channel that are further away.

In another aspect, the invention provides A brake fluid reservoir for a vehicle comprising: a shell configured to hold brake fluid for the vehicle, the shell defining a fill opening and an outer surface with a first perimeter; and a channel extending around at least a portion of the first perimeter of the outer surface of the shell, wherein the channel is configured to collect brake fluid spilt from the fill opening. At least a portion of the channel may be arranged at an angle to increase flow of fluid in the channel. The channel may have a drain arranged at a lowest portion of the channel. A section of the channel which is closest to the fill opening may be wider than portions of the channel that are further away. The channel may have a cross section with a first portion extending away from the outer surface of the outer wall and a second portion extending upward from the first portion.

BRIEF DESCRIPTION OF THE DRAWINGS

FIG. 1 is a side view from the left of an integrated power brake unit having a brake fluid reservoir according to one embodiment of the invention.

FIG. 2 shows various views of the reservoir of FIG. 1, wherein

FIG. 2a is a side view from the left of the reservoir of FIG. 1,

FIG. 2b is a front view of the reservoir of FIG. 1,

FIG. 2c is a side view from the right of the reservoir of FIG. 1,

FIG. 2d is a top view of the reservoir of FIG. 1,

FIG. 2e is a rear view of the reservoir of FIG. 1, and

FIG. 2f is an enlarged cross-sectional view of detail IIf of the reservoir of FIG. 1.

FIG. 3 shows various views of a second embodiment of a reservoir, wherein

FIG. 3e is an enlarged view of the front according to arrow IIIe of FIG. 3d with a broken out section of a channel.

FIG. 4 is a side view from the left of a third embodiment of a brake fluid reservoir.

FIG. 5 is a side view from the left of a fourth embodiment of a brake fluid reservoir

DETAILED DESCRIPTION

Figure 3A:
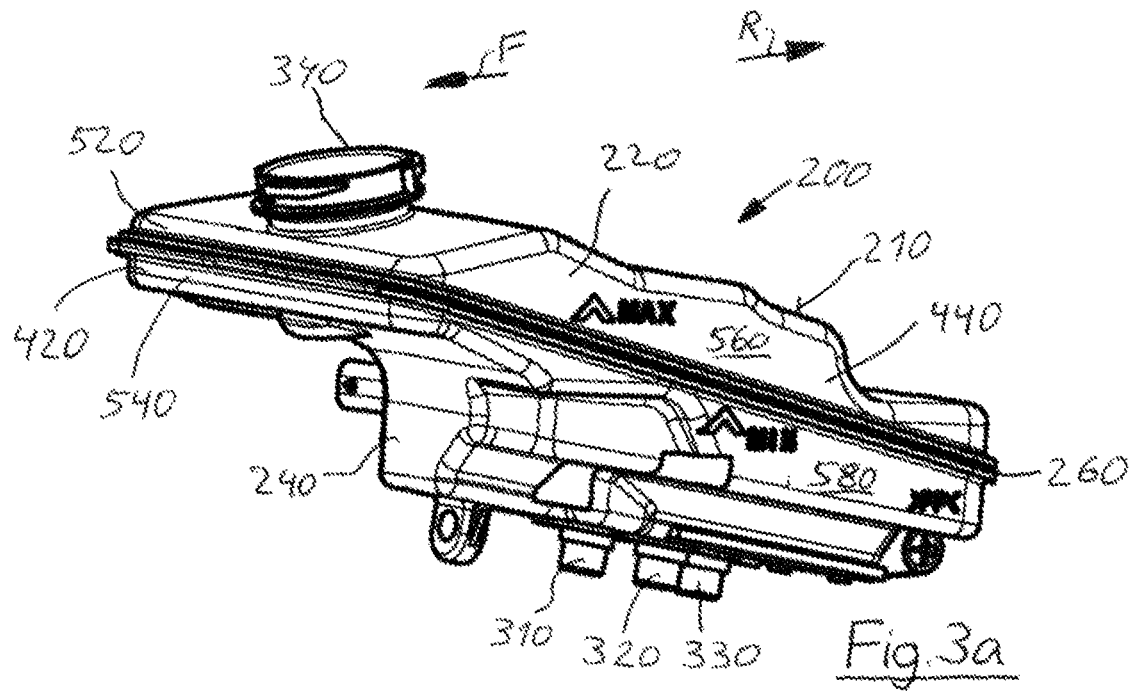
FIG. 3a is a perspective side view from the front and left of the reservoir.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

An integrated power brake (IPB) unit 10 is shown in FIG. 1. The IPB unit 10 includes a housing or block 12 that may contain both a brake booster (e.g., an electromechanical booster) and a brake master cylinder with outlet ports in fluid communication with the main chamber, in particular for supplying pressurized brake fluid to one or more brake circuits that contain one or more wheel cylinders to apply braking force to wheels 13 (e.g., squeezing a brake disc fixed to the wheel). The IPB unit 10 further includes an electronic controller coupled to a series of electronically-controlled valves inside the block 12, programmed to carry out anti-lock braking (ABS) performance strategy and/or electronic stability control (ESC) strategy. An electric motor 14 is coupled to the block 12 and has an output inside the block 12 operable to run at least one pump to generate a flow of pressurized brake fluid. The IPB unit 10 also has a connector 15 to electrically couple the IPB unit 10 to other systems of the car and supply it with power.

The IPB unit 10 has a defined orientation for mounting within a vehicle as defined by a brake input rod 16 that extends in a rearward direction R. The IPB unit 10 is mounted in the engine bay or under-hood area of the vehicle near or on the dash wall, with the brake input rod 16 extending toward a cabin space of the vehicle so that the brake input rod 16 is coupled to a driver-actuated brake pedal 18. Opposite the rearward direction R is a forward direction F, which is consistent with a normal forward travel direction of the vehicle. Although the brake input rod 16 of the IPB unit 10 is operable to mechanically generate a hydraulic braking force to the brake circuits upon depression of the vehicle brake pedal, the IPB unit 10 can operate in a full decoupled or brake-by-wire (BBW) mode in which braking force is generated by an electromechanical device (e.g., a motor-driven pump) that delivers fluid into the brake circuits with electronic pressure control (e.g., via an electronically-controlled pressure control valve), without utilizing pressure generated in the master cylinder by the brake input rod 16. Thus, mechanical force from the brake input rod 16 to activate the master cylinder is only provided as an emergency back-up. The IPB unit 10 can also function to provide non-driver-directed braking, or "active" braking, such as the case with adaptive cruise control or autonomous emergency braking in response to one or more types of vehicle sensors.

Adjacent a top side of the block 12 is a brake fluid reservoir 20 operable to store a quantity of hydraulic brake fluid to ensure that the braking circuits have a reserve quantity of fluid to draw from during braking operations. The reservoir 20, particularly an outer shell 21 of the reservoir 20, defines a reservoir chamber. As illustrated, the reservoir 20, particularly the outer shell 21, comprises an upper shell-portion 22 and a lower shell-portion 26. The upper shell-portion 22 and the lower shell-portion 24, respectively are bonded together, for example by an adhesive or a heat process, at a peripheral seam 26. The upper shell-portion 22 and lower shell-portions 24 can also be welded or joint in another manner. The shell-portions 22, 24 are made of plastic but can also be made of steel or another material.

Furthermore, the reservoir 20 has a shape, dictated by specific vehicle packaging constraints, that has a constant height at the rearward side and at the forward side. The height can be measured upwardly, orthogonal to a top surface 28 of the block 12, or alternately measured upwardly from a plane P in which the brake input rod 16 is located. The plane P is horizontal as illustrated in FIG. 1. It is noted that, in addition to forward and rearward directions F, R, the IPB unit 10 has a defined orientation with respect to top and bottom, in which the reservoir 20 is positioned atop and is coupled to the top surface 28 of the block 12 (a so-called "top-mount" reservoir). The reservoir 20 is positioned at a height above the block 12, and the master cylinder therein. The lower shell-portion 24 is provided with one or more outlet ports 31, 32, 33 corresponding to respective master cylinder inlet ports. The upper shell-portion 22 defines a fill opening 34 which is in fluid communication with the main chamber and normally closable by a cap 36 to close the main chamber from the surrounding environment The brake fluid reservoir is now described in more detail with respect to FIG. 2, the outer shell 21 has a rear wall 40 facing the rearward direction R and a front wall 42 facing the forward direction F. The outer shell 21 also has a left side-wall 44 and a right side-wall 46 extending between the rear wall 40 and front wall 42. The rear wall 40 is defined by an upper rear-wall-portion 48 which is part of the upper shell-portion 22 and a lower rear-wall-portion 50 which is part of the lower shell-portion 24. The front wall 42 is defined by an upper front-wall-portion 52 which is part of the upper shell-portion 22 and a lower front-wall-portion 54 which is part of the lower shell-portion 24. The left side-wall 44 is defined by an upper left side-wall-portion 56 which is part of the upper shell-portion 22 of the outer shell 21 and a lower left side-wall-portion 58 which is part of the lower shell-portion 24 of the outer shell 21. The right side-wall 46 is defined by an upper right side-wall-portion 60 which is part of the upper shell-portion 22 of the outer shell 21 and a lower right side-wall-portion 62 which is part of the lower shell-portion 24 of the outer shell 21. The walls 40, 42, 44, 46 shown are flat except for rounded corners. The walls 40, 42, 44, 46 could also be curved outwardly or be angled.

The outer shell 21 has an outer surface 64 with a first perimeter 66 around its sides, particularly defined by the walls 40, 42, 44, 46 of the reservoir 20. The outer shell 21 includes a channel 70. The channel 70 collects fluid and directs fluid away from an area below the lower shell-portion 24 of the outer shell 21 where it is not desired. The channel 70 extends around the outer surface 64 of the outer shell 21 and has a second perimeter 72 protruding outward from the first perimeter 66. The channel 70 is arranged along the entire first perimeter 66 of the brake fluid reservoir 20. The channel 70 comprises four portions: a rear wall channel-portion 74 along the rear wall 40, a front wall channel-portion 76 along the front wall 42, a left side-wall channel-portion 78 along the left side-wall 44 and a right side-wall channel-portion 80 along the right side-wall 46. The channel 70 may also extend only around some sections of the outer shell 70 so as to reduce the possibility of fluid dripping on certain parts of the IPB unit 10 such as the connector 15.

At least a portion of the channel 70 may be arranged at an angle of up to 45° with respect to the plane P to increase the flow of fluid in the channel 70, in particular the side-wall channel-portions 78, 80 extending along the side-walls 44, 46 are arranged at such an angle. Hence, the front wall channel-portion 76 is at a higher elevation then the rear wall channel-portion 74.

The channel 70 has an outlet portion or drain 82 distant from the outer surface 64 of the outer shell 21. If the channel 70 does not fully extend around the first perimeter 66 in a horizontal plane the drain 82 may be arranged at a lowest end of the channel 70. The drain 82 is arranged so that fluid does not drip, or that less fluid drips, onto the IPB unit 10 or certain parts of the IPB unit 10 such as the connector 15 or electric motor 14 or other parts where it is less desirable.

As can be seen in FIG. 2*d*, the channel 70 has a cross section 84 with a first portion 85 extending away from the outer surface 64 of the outer shell 21 and a second portion 86 extending upward from the first portion 85. In particular, the first and second portions 85, 86 form an L-shape. The width of the channel ranges from 1 to 8 mm and the height from 2 to 6 mm. The cross section may have a wall thickness corresponding to the wall thickness of the outer shell of typically 1.5 to 3 mm.

The upper shell-portion 22 has a lower edge 90 extending around the upper shell-portion 22 and the lower shell-portion 24 has an upper edge 92 extending around the lower shell-portion 24. The edges 90, 92 are joint to form the seam 26 as described above. The channel 70 extends along the seam 26. The channel 70 is part of the upper shell-portion 22. In particular, the lower edge 90 may have a lower flange 94 and the upper edge 92 an upper flange 96 which are connected to each other. The channel 70 is part of the lower flange 94 of the upper shell-portion 22.

The channel does not have to follow the edges 90, 92 of the upper shell-portion 22 or the lower shell-portion 24. It could also be arranged at a higher elevation than shown. The channel 70 also does not have to be at a most outward perimeter of the outer shell. It should be arranged so as to at least reduce the amount of fluid dripping onto the IPB unit 10 or other components below the reservoir 20 where it is not desired. Baffles can be added along the perimeter to create compartments to hold fluid.

FIG. 3. shows a second embodiment of a brake fluid reservoir 200 that can also be arranged on top of the block 12 of the IPB unit 10 of FIG. 1. The reservoir 200, particularly an outer shell 210 of the reservoir, comprises an upper shell-portion 220 and a lower shell-portion 240. The upper shell-portion 220 and the lower shell-portion 240, respectively are bonded together, for example by an adhesive or a heat process, at a peripheral seam 260. The upper shell-portion 220 and lower shell-portions 240 can also be welded or joint in another manner. The shell-portions 220, 240 are made of plastic but can also be made of steel or another material. The lower shell-portion 240 is provided with one or more outlet ports 310, 320, 330 corresponding to respective master cylinder inlet ports of an IPB unit 10. The upper shell-portion 220 defines a fill opening 340 normally closed by a reservoir cap 360.

The outer shell 210 of the reservoir 200 has a rear wall 400 facing a rearward direction R and a front wall 420 facing a forward direction F. The front wall 420 is wider than the rear wall 400. The outer shell 210 has a left side-wall 440 and a right side-wall 460 extending between the rear wall 400 and front wall 420. The rear wall 400, the front wall 420 and the left side-wall 400 are substantially flat except for rounded corners bordering adjacent walls. The right side-wall 460 is curved inwardly starting at the front wall 420 towards the rear wall 400. It is noted that the walls 400, 420, 440, 460 may have different shapes. The front wall 420 could be as wide as the rear wall 400 or not as wide. The side-walls 440, 460 could both be straight or curved. All walls 400, 420, 440, 460 could be straight, curved or angled.

The rear wall 400 is defined by an upper rear-wall-portion 480 which is part of the upper shell-portion 220 and a lower rear-wall-portion 500 which is part of the lower shell-portion 240. The front wall 420 is defined by an upper front-wall-portion 520 which is part of the upper shell-portion 220 and a lower front-wall-portion 540 which is part of the lower shell-portion 240. The left side-wall 440 is defined by an upper left side-wall-portion 560 which is part of the upper shell-portion 220 of the outer shell 210 and a lower left side-wall-portion 580 which is part of the lower shell-portion 240 of the outer shell 210. The right side-wall 460 is defined by an upper right side-wall-portion 600 which is part of the upper shell-portion 220 of the outer shell 210 and a lower right side-wall-portion 620 which is part of the lower shell-portion 240 of the outer shell 210. The reservoir 200 includes a fluid level sensor whose connector 625 is shown in FIG. 3b which is arranged in the lower right side-wall-portion 620. The fluid level sensor could also be arranged in another one of the walls 400, 420 or 440.

Figure 3B:
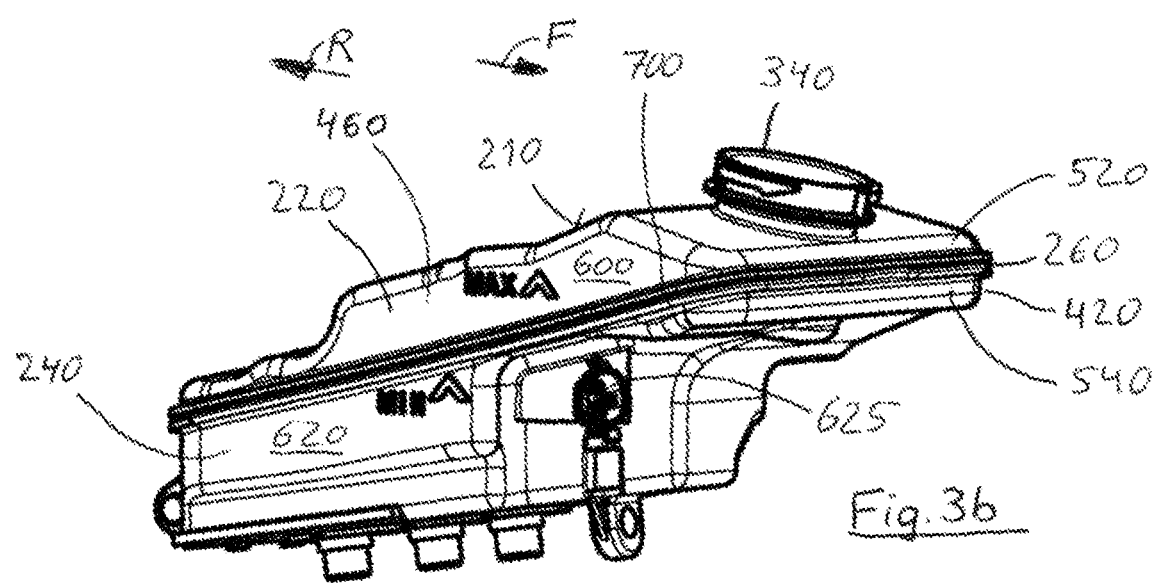
FIG. 3b is a front view from the front and right of the reservoir.
Figure 3C:
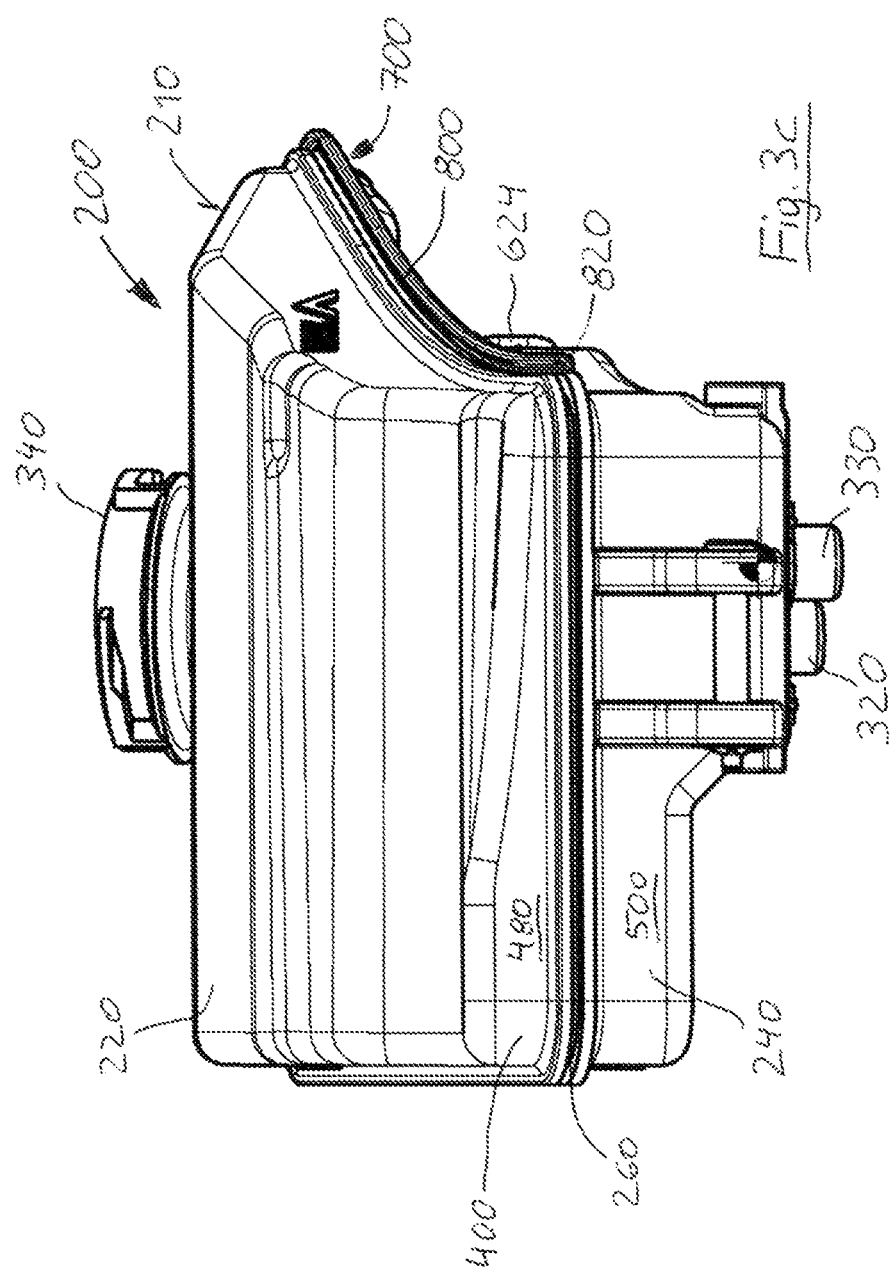
FIG. 3c is a rear view of the reservoir.
Figure 3D:
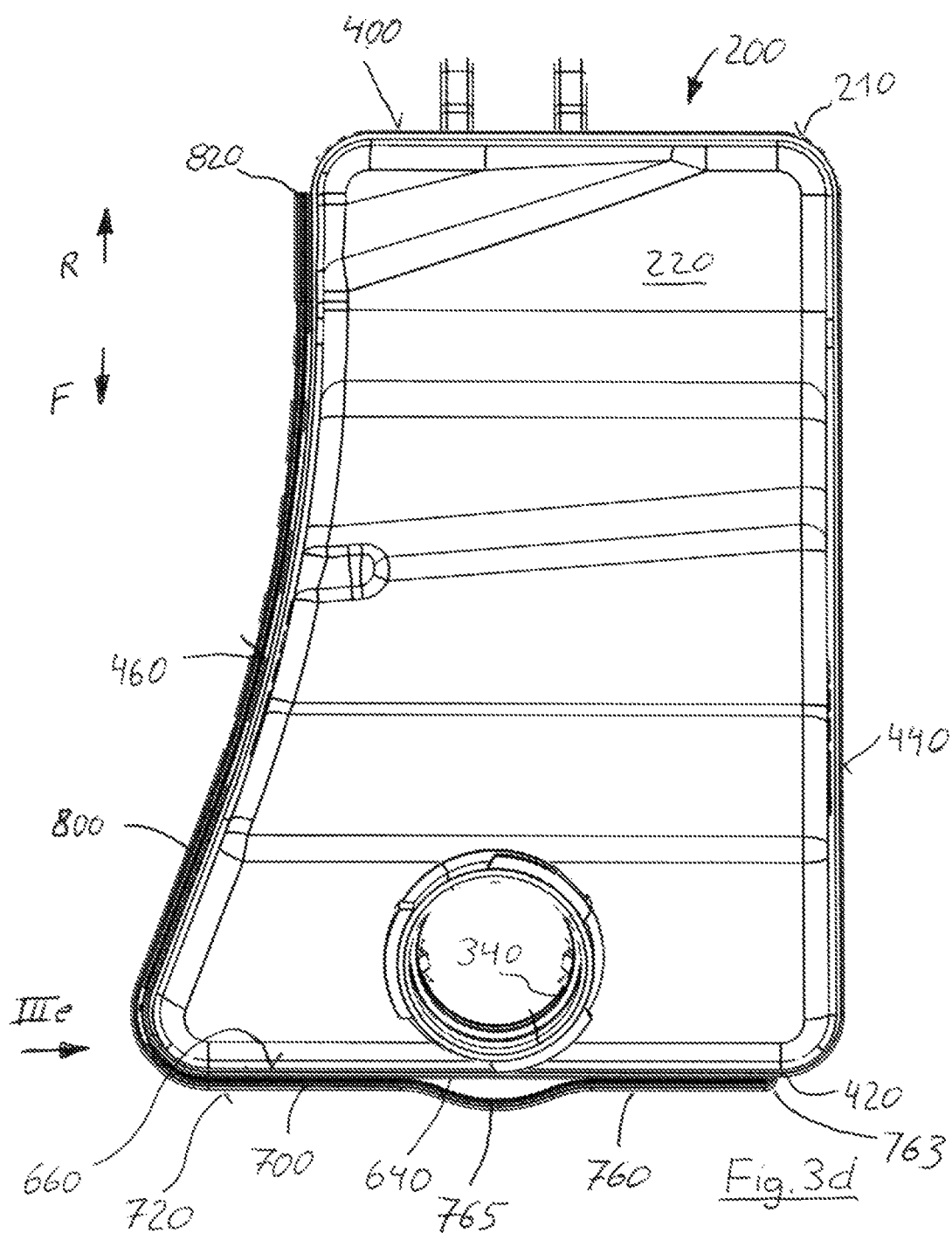
FIG. 3d is a top view of the reservoir.

As best can be seen in FIG. 3d, the outer shell 210 has an outer surface 640 with a first perimeter 660 around its sides, particularly defined by the walls 400, 420, 440, 460 of the reservoir 200. The outer shell 210 includes a channel 700. The channel 700 collects fluid and directs fluid away from an area below the upper shell-portion 220 of the outer shell 210. The channel 700 extends around sections of the outer surface 640 of the outer shell 210 and has a second perimeter 720 protruding outward from the first perimeter 660. The channel 700 is arranged along sections of the first perimeter 660 of the brake fluid reservoir 200. The channel 700 comprises two portions: a front wall channel-portion 760 along the front wall 420 and a right side-wall channel-portion 800 along the right side-wall 460. The front wall channel-portion 760 has a first end 763 near the left side-wall 440 which is closed so that fluid may not drip out. The front wall channel-portion 760 also has a section 765 which is wider than the rest of the channel 700. The section 765 is also the portion of the channel 700 which is closest to the fill opening 360. The channel 700 is curved between the front wall channel portion 760 and the right side-wall channel-portion 800. At least a portion of the channel 700 may be arranged at an angle of up to 45° with respect to the plane P to increase the flow of fluid in the channel 700, in particular the right side-wall channel-portions 800 extending along the right side-wall 460 is arranged at such an angle as shown. The second end of the right side-wall channel-portion 800 which is distant from the front wall channel-portion 800 is open and defines an outlet portion or drain 820. The drain 820 is arranged at the lowest end of the channel 700. The drain 820 is near the rear wall 400. But the right side-wall channel-portion 800 does not have to extend all the way to the rear wall 400. The drain 820 is arranged so that fluid does not drip, or that less fluid drips, onto the IPB unit 10 or certain parts of the IPB unit 10 such as the connector 15 or electric motor 14 or other parts such as the connector fluid level sensor and/or its connector 625.

As best can be seen in FIG. 3e, the channel 700 has a cross section 840 with a first portion 850 extending away from the outer surface 640 of the outer shell 210 and a second portion 860 extending upward from the first portion 850. In particular, the first and second portions 850, 860 form an L-shape. The width of the channel ranges from 1.5 to 5 mm and the height from 2.5 to 3.5 mm. The cross section may have a wall thickness corresponding to the wall thickness of the outer shell of typically 1.5 to 3 mm. The second portion 860 joins the front wall 420 at the first end 763 where the front wall channel-portion 760 starts near the left side-wall 440 as described above.

The upper shell-portion 220 has a lower edge 900 extending around the upper shell-portion 220 and the lower shell-portion 240 has an upper edge 920 extending around the lower shell-portion 240. The edges 900, 920 are joint to form the seam 260 as described above. The channel 70 extends along the seam 260. The channel 700 is part of the upper shell-portion 220. In particular, the lower edge 900 may have a lower flange 940 and the upper edge 920 an upper flange 960 which are connected to each other. The channel 700 is part of the lower flange 940 of the upper shell-portion 220.

The channel does not have to follow the edges 900, 920 of the upper shell-portion 220 or the lower shell-portion 240. It could also be arranged at a higher elevation than shown. The channel 700 also does not have to be at a most outward perimeter of the outer shell 210. It should be positioned so as to at least reduce the amount of fluid dripping onto the IPB unit 10 or other components where it is not desired. Baffles can be added along the perimeter to create compartments to hold fluid. The fluid level sensor, its connector 625 or another component for which the risk of getting in contact with fluid should be reduced should be arranged below the channel 700.

FIG. 4 shows the third embodiment of a brake fluid reservoir 2000. The reservoir 2000 has a rear wall 4000 and a front wall 4200. A fill opening 3400 is oriented in the forward direction F closer to the front wall 4000. The rear wall 4000 and front wall 4200 are connected by side-walls of which only a left side-wall 4400 can be seen. The left side-wall 4400 is defined by an upper left side-wall portion 5600 and a lower left side-wall portion 5800. A channel 7000 similar in function as channels 70 and 700 extends around the reservoir 2000. The channel 7000 includes a rear wall channel-portion 7400 extending along the rear wall 4000 and a front wall channel-portion 7600 along the front wall 4200. The rear wall channel-portion 7400 and the front wall channel-portion 7600 along the front wall 4200 are connected by a left side-wall channel-portion 7800. The left side-wall channel-portion 7800 descends from the rear wall channel portion 7400 to the front wall channel-portion 7600. The front wall channel-portion 7600 hence is at a lower elevation then the rear wall channel portion 7400. A drain 8200 is arranged at the front wall channel-portion 7600.

FIG. 5 shows the third embodiment of a brake fluid reservoir 20000. The reservoir 20000 has a rear wall 40000 and a front wall 42000. A fill opening 34000 is oriented in the forward direction F closer to the front wall 40000. The rear wall 40000 and front wall 42000 are connected by side-walls of which only a left side-wall 44000 can be seen. The left side-wall 44000 is defined by an upper left side-wall portion 56000 and a lower left side-wall portion 58000. A channel 70000 similar in function as channels 70 and 700 extends around the reservoir 20000. The channel 70000 includes a rear wall channel-portion 74000 extending along the rear wall 40000 and a front wall channel-portion along the front wall 42000. The rear wall channel-portion 74000 and the front wall channel-portion 76000 along the front wall 42000 are connected by a left side-wall channel-portion 78000. The left side-wall channel-portion 78000 is in a horizontal plane when a vehicle in which it is mounted is level. The front wall channel-portion 76000 hence is at the same elevation as the rear wall channel portion 74000. A drain 82000 is arranged at the rear wall channel-portion 74000.

Figure 6:
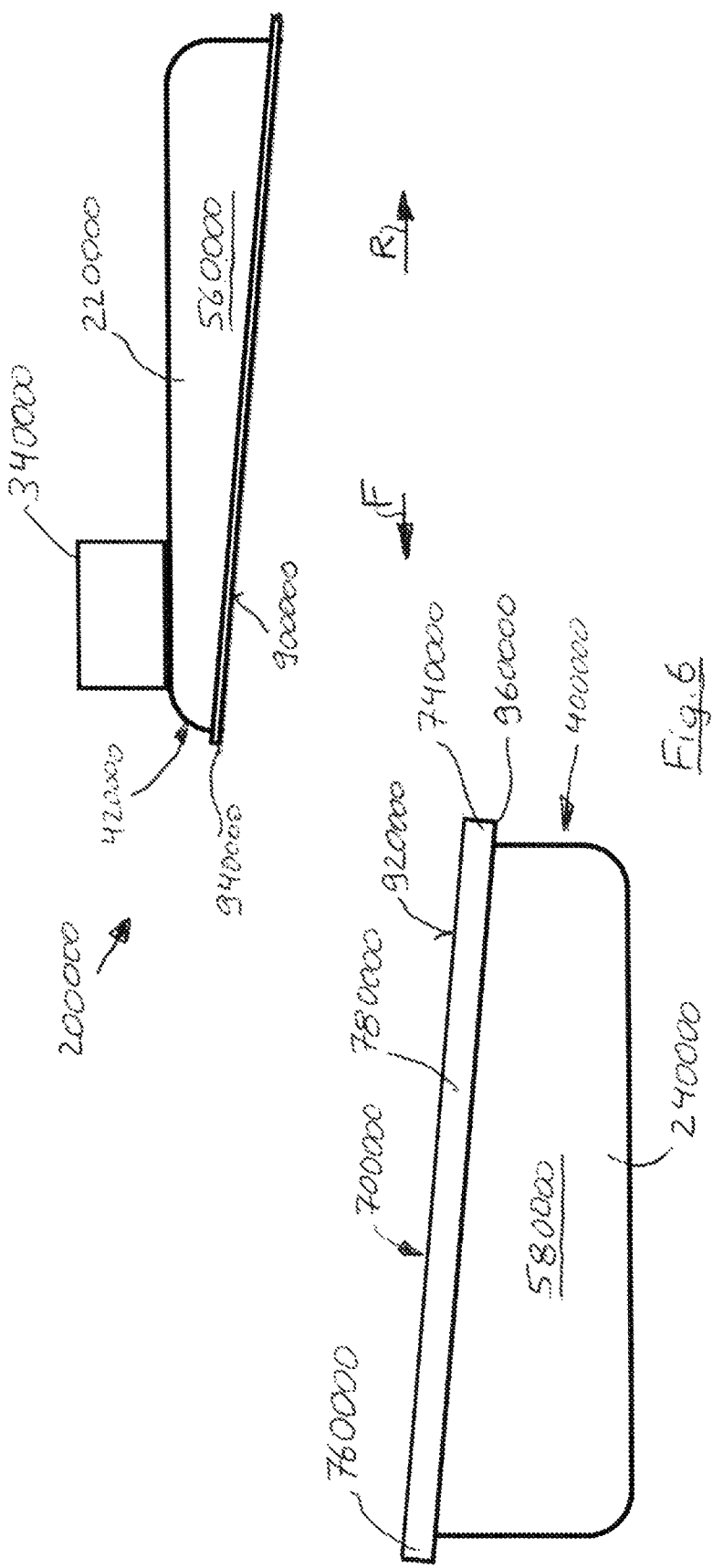
FIG. 6 is an exploded side view from the left of a fifth embodiment of a brake fluid reservoir.

FIG. 6 shows the fourth embodiment of a brake fluid reservoir 200000. The reservoir 200000 is defined by an upper shell-portion 220000 and a lower shell-portion 240000. The reservoir 200000 has a rear wall 400000 and a front wall 420000. A fill opening 360000 is oriented in the forward direction F closer to the front wall 400000. The rear wall 400000 and front wall 420000 are connected by side-walls of which only a left side-wall 440000 can be seen. The left side-wall 44000 is defined by an upper left side-wall portion 56000 and a lower left side-wall portion 58000. A channel 70000 similar in function as channels 70 and 700 extends around the reservoir 20000. The upper shell-portion 220000 has a lower edge 900000 extending around the upper shell-portion 220000 and the lower shell-portion 240000 has an upper edge 920000 extending around the lower shell-portion 240000. The edges 900000, 920000 can be joint to form a seam as the seams 26 and 260 as described above. The channel 700000 extends along that seam. The channel 700000 is part of the lower shell-portion 240000. In particular, the lower edge 900000 may have a lower flange 940000 and the upper edge 920000 a lower flange 960000. In this embodiment the channel 700000 is part of the upper flange 960000 of the lower shell-portion 24000.

Although the reservoir 20, 200, 2000, 20000, 200000 is described here for use with the IPB unit 10, it is contemplated that the reservoir 20, 200, 2000, 20000, 200000 may be used with other types of pressure units, including, but not limited to, those including only master cylinders and those including only boosters. The shell was described as comprising two shell-portions it can also be made up by one shell or more than two shell-portions.

Selective illustrative embodiments of the IPB unit 10 and brake fluid reservoir 20, 200, 2000, 20000, 200000 are described above in some detail. It should be understood that only structures considered necessary for clarifying these devices have been described herein. Other conventional structures, and those of ancillary and auxiliary components of the IPB unit 10 and brake fluid reservoir 20, 200, 2000, 20000, 200000, are assumed to be known and understood by those skilled in the art. Moreover, while working examples of the IPB unit 10 and brake fluid reservoir 20, 200, 2000, 20000, 200000 have been described above, the IPB unit 10 and brake fluid reservoir 20, 200, 2000, 20000, 200000 are not limited to the working examples described above, but various design alterations may be carried out without departing from the devices as set forth in the claims. The invention is not limited to integrated power brakes but can also be applied to other brake systems.

What is claimed is:

1. A brake fluid reservoir for a vehicle comprising:
a shell defining a main chamber for containing a quantity of brake fluid for one or more vehicle brake circuits having an outer surface;
a fill opening defined by the shell in an upper portion of the outer shell, the fill opening in fluid communication with the main chamber and closable by a cap to close the main chamber from the surrounding environment;
outlet ports defined by the shell in a lower portion of the outer shell, the outlet ports in fluid communication with the main chamber; and
a channel located along at least a section of the outer surface between the fill opening and the outlet ports, wherein the channel is configured to collect fluid when fluid exits the opening along the outer surface.

2. The brake fluid reservoir according to claim 1, wherein at least a portion of the channel is arranged at an angle to increase flow of fluid in the channel.

3. The brake fluid reservoir according to claim 1, wherein the channel is arranged along a first perimeter of the brake fluid reservoir.

4. The brake fluid reservoir of claim 3, wherein a drain is arranged at a lowest portion of the channel.

5. The brake fluid reservoir of claim 1, wherein the channel has a cross section with a first portion extending away from the outer surface of the outer wall and a second portion extending upward from the first portion.

6. The brake fluid reservoir of claim 5, wherein the first and second portions form an L-shape.

7. The brake fluid reservoir of claim 5, wherein the cross section has a wall thickness corresponding to the wall thickness of the outer shell.

8. The brake fluid reservoir of claim 1, wherein the upper portion is an upper shell-portion having a lower edge extending around the upper shell-portion and the lower portion has an upper edge extending around a lower shell-portion, the edges are joint to form a seam, the channel extends along the seam, and the channel is one of part of the upper shell-portion and part of the lower shell-portion.

9. The brake fluid reservoir of claim 8, wherein the lower edge has a lower flange and the upper edge has an upper flange, the flanges are connected to each other and the channel extends along one of the lower flange and the upper flange.

10. The brake fluid reservoir of claim 1, wherein the outer shell has a rear wall facing a rearward direction and a front wall facing a forward direction of the outer shell, the outer shell also has two side-walls and extending between the rear wall and front wall, and the channel extends along a front wall and a side-wall.

11. The brake fluid reservoir of claim 1, wherein a section of the channel which is closest to the fill opening is wider than portions of the channel that are further away.

12. A brake fluid reservoir for a vehicle comprising:
a shell configured to hold brake fluid for the vehicle, the shell defining a fill opening and an outer surface with a first perimeter; and
a channel extending around at least a portion of the first perimeter of the outer surface of the shell, wherein the channel is configured to collect brake fluid spilt from the fill opening.

13. The brake fluid reservoir according to claim 12, wherein
at least a portion of the channel is arranged at an angle to increase flow of fluid in the channel.

14. The brake fluid reservoir of claim 13, wherein
the channel has a drain arranged at a lowest portion of the channel.

15. The brake fluid reservoir of claim 12, wherein
a section of the channel which is closest to the fill opening is wider than portions of the channel that are further away.

16. The brake fluid reservoir of claim 12, wherein
the channel has a cross section with a first portion extending away from the outer surface of the outer wall and a second portion extending upward from the first portion.

17. The brake fluid reservoir of claim 16, wherein
the first and second portions form one of an L-shape and a C-shape.

18. The brake fluid reservoir of claim 16, wherein
the cross section has a wall thickness corresponding to the wall thickness of the outer shell.

19. The brake fluid reservoir of claim 12, wherein
an upper portion of the shell has a lower edge extending around the upper portion and a lower portion of the shell has an upper edge extending around the lower portion, the edges are joint to form a seam, the channel extends along the seam, and the channel is one of part of the upper portion and part of the lower portion.

20. The brake fluid reservoir of claim 19, wherein
the lower edge has a lower flange and the upper edge has an upper flange and the channel extends along one of the lower flange and the upper flange.

* * * * *